(12) United States Patent
Mochizuki et al.

(10) Patent No.: US 7,771,299 B2
(45) Date of Patent: Aug. 10, 2010

(54) V-BELT CONTINUOUSLY VARIABLE TRANSMISSION AND STRADDLE-TYPE VEHICLE

(75) Inventors: Shigehiro Mochizuki, Shizuoka (JP); Kazuhiko Izumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 332 days.

(21) Appl. No.: 11/467,201

(22) Filed: Aug. 25, 2006

(65) Prior Publication Data
US 2007/0054765 A1 Mar. 8, 2007

(30) Foreign Application Priority Data
Sep. 5, 2005 (JP) ............................. 2005-256703

(51) Int. Cl.
*F16H 61/00* (2006.01)
*F16H 59/00* (2006.01)

(52) U.S. Cl. ................... 474/12; 474/13; 474/15; 474/18; 474/109; 474/133; 474/135; 474/144; 180/229; 180/358; 180/908

(58) Field of Classification Search ............. 474/12, 474/144–147; 477/46–48
See application file for complete search history.

(56) References Cited

U.S. PATENT DOCUMENTS

| | | | |
|---|---|---|---|
| 4,631,043 A | | 12/1986 | Tokoro et al. |
| 5,025,686 A | * | 6/1991 | Sato et al. ............. 477/44 |
| 5,052,980 A | * | 10/1991 | Itoh et al. ............. 474/11 |
| 5,514,047 A | | 5/1996 | Tibbles et al. |
| 6,238,312 B1 | * | 5/2001 | Tsubata et al. ......... 474/144 |
| 6,694,836 B2 | * | 2/2004 | Kawamoto et al. ........ 74/371 |
| 6,884,191 B2 | * | 4/2005 | Temma et al. .......... 474/109 |
| 2002/0096386 A1 | | 7/2002 | Kawamoto et al. |
| 2004/0116245 A1 | * | 6/2004 | Yamamoto et al. ........ 477/46 |
| 2005/0107194 A1 | * | 5/2005 | Oishi et al. ............ 474/28 |
| 2005/0239592 A1 | * | 10/2005 | Schoenek et al. ......... 474/144 |

FOREIGN PATENT DOCUMENTS

| | | |
|---|---|---|
| DE | 38 29 262 A1 | 3/1989 |
| EP | 0 615 082 A1 | 9/1994 |
| JP | 06-249309 A | 9/1994 |
| JP | 2852994 B2 | 11/1998 |
| JP | 2002-227947 A | 8/2002 |
| JP | 2004-156657 A | 6/2004 |

OTHER PUBLICATIONS

Official communication issued in the corresponding European Application No. 06 018 581.6, mailed on Feb. 7, 2007.
Mochizuki et al.; "V-Belt Continuously Variable Transmission and Straddle-Type Vehicle"; U.S. Appl. No. 11/466,795.

* cited by examiner

*Primary Examiner*—Robert A Siconolfi
*Assistant Examiner*—San Aung
(74) *Attorney, Agent, or Firm*—Keating & Bennett, LLP

(57) ABSTRACT

A V-belt continuously variable transmission (CVT) for a straddle-type vehicle includes a measurement plate for a rotational speed sensor for detecting a rotational speed of a primary sheave shaft to control a speed change ratio. The measurement plate is disposed on an opposite end of the primary sheave shaft, to one end of which a driving force of an engine is input, with respect to a primary sheave.

11 Claims, 8 Drawing Sheets

V-BELT CONTINUOUSLY VARIABLE TRANSMISSION AND STRADDLE-TYPE VEHICLE

BACKGROUND OF THE INVENTION

1. Field of the Invention

The present invention relates to a V-belt continuously variable transmission (CVT) for transmitting a driving force of an engine to a driving wheel, and a straddle-type vehicle having such a V-belt CVT disposed below a seat of the vehicle.

2. Description of the Related Art

Recently, there is an increasing demand for straddle-type vehicles called "ATVs (all-terrain vehicles)."

Also, there have been proposed various types of ATVs in which four wheels are provided, each wheel having a wide and low-pressure balloon tire or the like on the left and right sides of the front and rear sides of a body frame, the upper portion of the body frame is provided with steering handlebars, a fuel tank, and a straddle-type seat, arranged sequentially from the front wheel side to the rear wheel side, and a V-belt CVT disposed below the seat and for transmitting a driving force of an engine to driving wheels (see JP-A-2004-156657, for example).

The above-described V-belt CVT includes a primary sheave disposed on a primary sheave shaft to which the driving force of the engine is input, and having a movable sheave half and a fixed sheave half to form a V-groove for receiving a belt; a secondary sheave disposed on a secondary sheave shaft from which a driving force for the driving wheels is output, and having a movable sheave half and a fixed sheave half to form a V-groove for receiving a belt; an endless V-belt received in the respective V-grooves of the primary sheave and the secondary sheave to transmit a rotational driving force between both the sheaves; and a sheave drive mechanism for displacing the movable sheave half of the primary sheave in the axial direction to control the speed change ratio through resulting variations in respective groove widths of the primary sheave and the secondary sheave.

A previous type of sheave drive mechanism, in general, was the so-called centrifugal type which utilized centrifugal force produced according to the engine speed to displace a movable sheave half in the axial direction.

However, when the road on which the vehicle is running turns from a flat road to a climbing road, for example, the sheave drive mechanism of the centrifugal type does not perform a groove width control operation (specifically, a speed change operation) responsively according to changes in the road condition, irrespective of the intention of the rider, until the engine speed has actually decreased because of the increased load from the road. That is, the sheave drive mechanism has a problem of delayed response.

In order to solve the problem of delayed response, another type of V-belt CVT for use in scooter-type motorcycles has been proposed, which includes an electric motor, a control device for controlling the electric motor, a sheave drive mechanism for transmitting a driving force of the electric motor to the movable sheave half of the primary sheave to adjust the respective groove widths of the primary sheave and the secondary sheave, and a rotational speed sensor for detecting rotation of the primary sheave or the secondary sheave to inform the control device of the detected rotation so that the control device can perform a control according to the engine operating condition (see JP-B-2852994, for example).

In general, the scooter-type motorcycle is provided with an integral power unit including an engine and a V-belt CVT attached to a side of a crankcase of the engine. In such a scooter-type motorcycle, the power unit may be swingably suspended from a body frame to function as a swing arm for swingably supporting a rear wheel.

For V-belt CVTs for use in ATVs, there is a need to electrically control the respective groove widths of the primary sheave and the secondary sheave in order to improve response in the speed change process.

However, since ATVs are significantly different in structure from scooter-type motorcycles, the installation method of an electric motor and a rotational speed sensor used in V-belt CVTs of scooter-type motorcycles cannot be used in ATVs.

That is, the engine and the V-belt CVT must be made compact in ATVs when a footrest for the rider is disposed on the outer side of the crankcase and the V-belt CVT. Thus, it is not easy to ensure an installation space for the electric motor and the rotational speed sensor, even on the outer side of the vehicle body. This is because the rotational speed sensor would project greatly to the outer side of the vehicle body and hence prevent the rider from putting his/her foot in place, thereby interfering with the usability of the ATV.

In the case where the rotational speed sensor is located around the outer periphery of the primary sheave or the secondary sheave, a transmission casing is increased in size and hence the V-belt CVT cannot be made compact.

In addition, in the case where the rotational speed sensor is installed near a heat producing part such as a cylinder block of the engine, the service life of the rotational speed sensor and/or the measurement accuracy of the sensor may be reduced and therefore the original performance cannot be maintained.

SUMMARY OF THE INVENTION

In order to overcome the problems described above, preferred embodiments of the present invention provide a compact, yet durable V-belt CVT and straddle-type vehicle achieving a speed change operation that is highly responsive to the vehicle running condition.

According to a preferred embodiment of the present invention, a V-belt type CVT includes a primary sheave disposed on a primary sheave shaft, to one end of which a driving force of an engine is input, and having a movable sheave half and a fixed sheave half to form a V-groove for receiving a belt; a secondary sheave disposed on a secondary sheave shaft, from which a driving force for a driving wheel is output, and having a movable sheave half and a fixed sheave half arranged to form a V-groove for receiving a belt; a V-belt received in the respective V-grooves of the primary sheave and the secondary sheave to transmit a rotational driving force between both the sheaves; an electric motor; a control device for controlling the electric motor; and a sheave drive mechanism for transmitting a driving force of the electric motor to the movable sheave half of the primary sheave to adjust respective groove widths of the primary sheave and the secondary sheave, wherein a part to be detected for a rotational speed sensor for detecting a rotational speed of the primary sheave shaft is disposed on the other end of the primary sheave shaft with respect to the primary sheave.

In the V-belt CVT having the above-described unique structure, it is preferred that the sheave drive mechanism for adjusting the respective groove widths of the primary sheave and the secondary sheave through the electric motor is located on the primary sheave shaft on an outer side of the movable sheave half of the primary sheave with respect to the fixed sheave half of the primary sheave, and that the rotational speed sensor is located toward a second end of the primary sheave shaft with respect to the sheave drive mechanism.

In addition, it is preferred that the part to be detected has an outside diameter smaller than that of a reciprocating gear in the sheave drive mechanism.

Also, it is preferred that the rotational speed sensor is located adjacent to an outer periphery of the part to be detected.

In addition, in the V-belt CVT with the above structure, it is preferred that the part to be detected is located closer to the second end of the primary sheave shaft with respect to a roller bearing for supporting the second end of the primary sheave shaft, and has an outside diameter larger than that of the roller bearing.

In addition, it is preferred that the rotational speed sensor is attached to a support member secured to a transmission case for supporting the other end of the primary sheave shaft.

It is also preferred that at least one of a portion of the sheave drive mechanism and the electric motor is attached to the support member.

Also, another preferred embodiment of the present invention provides a V-belt type CVT including a primary sheave disposed on a primary sheave shaft, to which a driving force of an engine is input, and having a movable sheave half and a fixed sheave half to form a V-groove for receiving a belt; a secondary sheave disposed on a secondary sheave shaft, from one end of which a driving force for a driving wheel is output, and having a movable sheave half and a fixed sheave half to form a V-groove for receiving a belt; a V-belt received in the respective V-grooves of the primary sheave and the secondary sheave to transmit a rotational driving force between both the sheaves; an electric motor; a control device for controlling the electric motor; and a sheave drive mechanism for transmitting a driving force of the electric motor to the movable sheave half of the primary sheave to adjust respective groove widths of the primary sheave and the secondary sheave, wherein a part to be detected for a rotational speed sensor for detecting a rotational speed of the secondary sheave shaft is located on the other end of the secondary sheave shaft with respect to the secondary sheave.

Another preferred embodiment of the present invention provides a straddle-type vehicle having the V-belt CVT with the above-described unique structure disposed below a seat and a footrest disposed on the other side of the primary sheave shaft of the V-belt CVT, wherein the rotational speed sensor is located above a horizontal plane including the primary sheave shaft.

In the V-belt CVT constructed as described above, the rotational speed sensor for detecting the rotational speed of the primary sheave shaft and the secondary sheave is disposed on a portion of the primary sheave shaft, to a first end of which the driving force of the engine is input, toward a second end with respect to the primary sheave. In this way, the rotational speed sensor can be spaced away from the cylinder block of the engine which can be hot, and also, it is not necessary to ensure an installation space for the rotational speed sensor around the outer periphery of the primary sheave.

Thus, it is possible to obtain a compact, yet durable V-belt CVT achieving a speed change operation highly responsive to the engine operating condition.

In the straddle-type vehicle constructed as described above, the V-belt CVT of the present preferred embodiment is located below the seat and the rotational speed sensor is located above a horizontal plane including the primary sheave shaft. In this way, a projection toward a lateral side of the vehicle body due to the installation of the rotational speed sensor is arranged above the foot placed on the footrest and thus does not prevent the rider from putting his/her foot in place.

Thus, it is possible to provide a rotational speed sensor without sacrificing the possibility of a compact V-belt CVT located below the seat and without hindering the rider from putting his/her feet in place on both sides of the vehicle body, thereby achieving a straddle-type vehicle with a speed change operation that is highly responsive to the vehicle running condition.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of a V-belt continuously variable transmission (CVT) and a straddle-type vehicle according to the present invention will hereinafter be described in detail with reference to the accompanying drawings.

Figure 1:
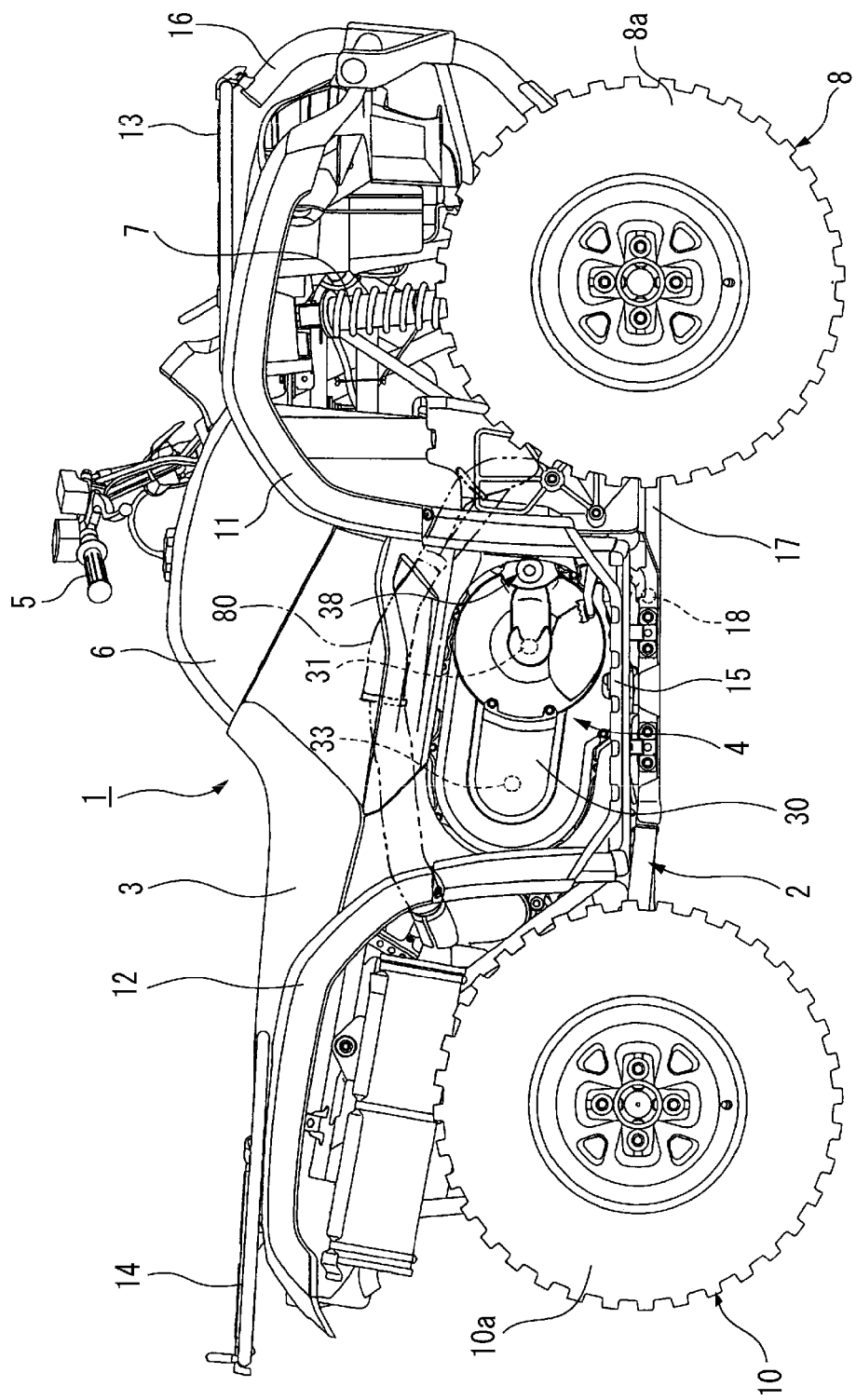
FIG. 1 is a right side view of a straddle-type vehicle incorporating a power unit in which a V-belt CVT according to a first preferred embodiment of the present invention is assembled to an engine.
Figure 2:
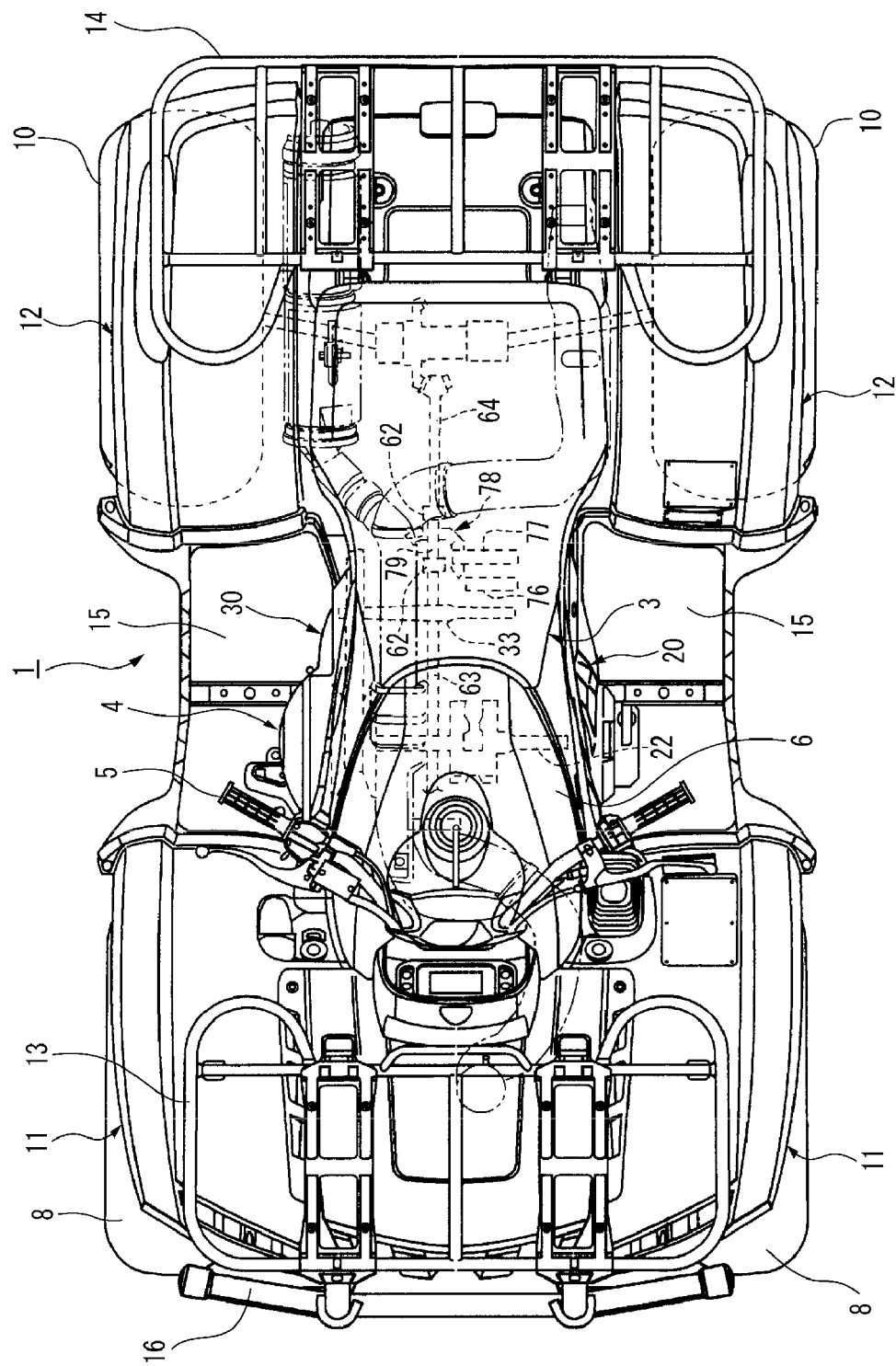
FIG. 2 is a plan view of the straddle-type vehicle shown in FIG. 1.
Figure 3:
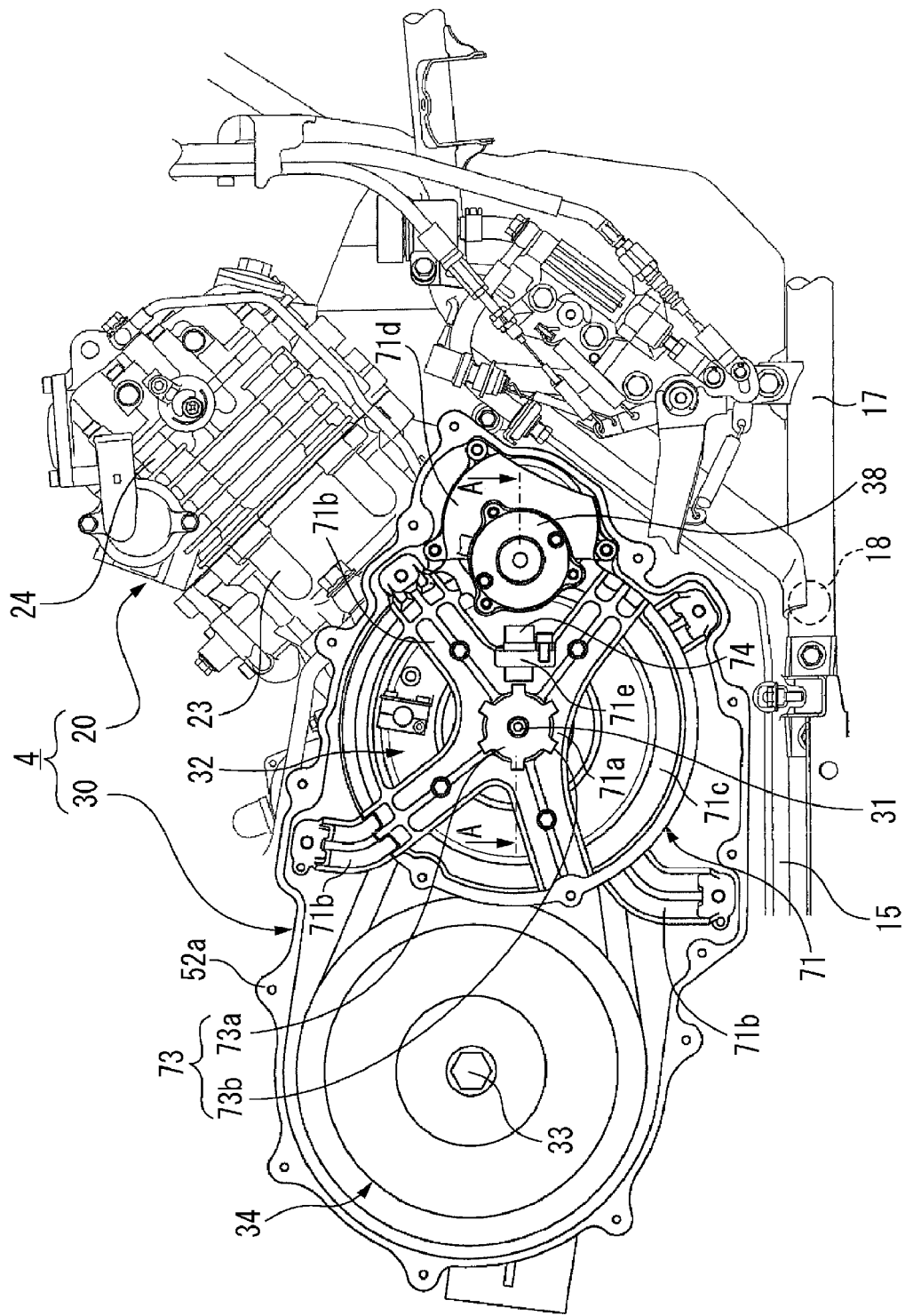
FIG. 3 is a right side view of the power unit mounted in the straddle-type vehicle shown in FIG. 1 with a cover of the V-belt CVT removed.
Figure 4:
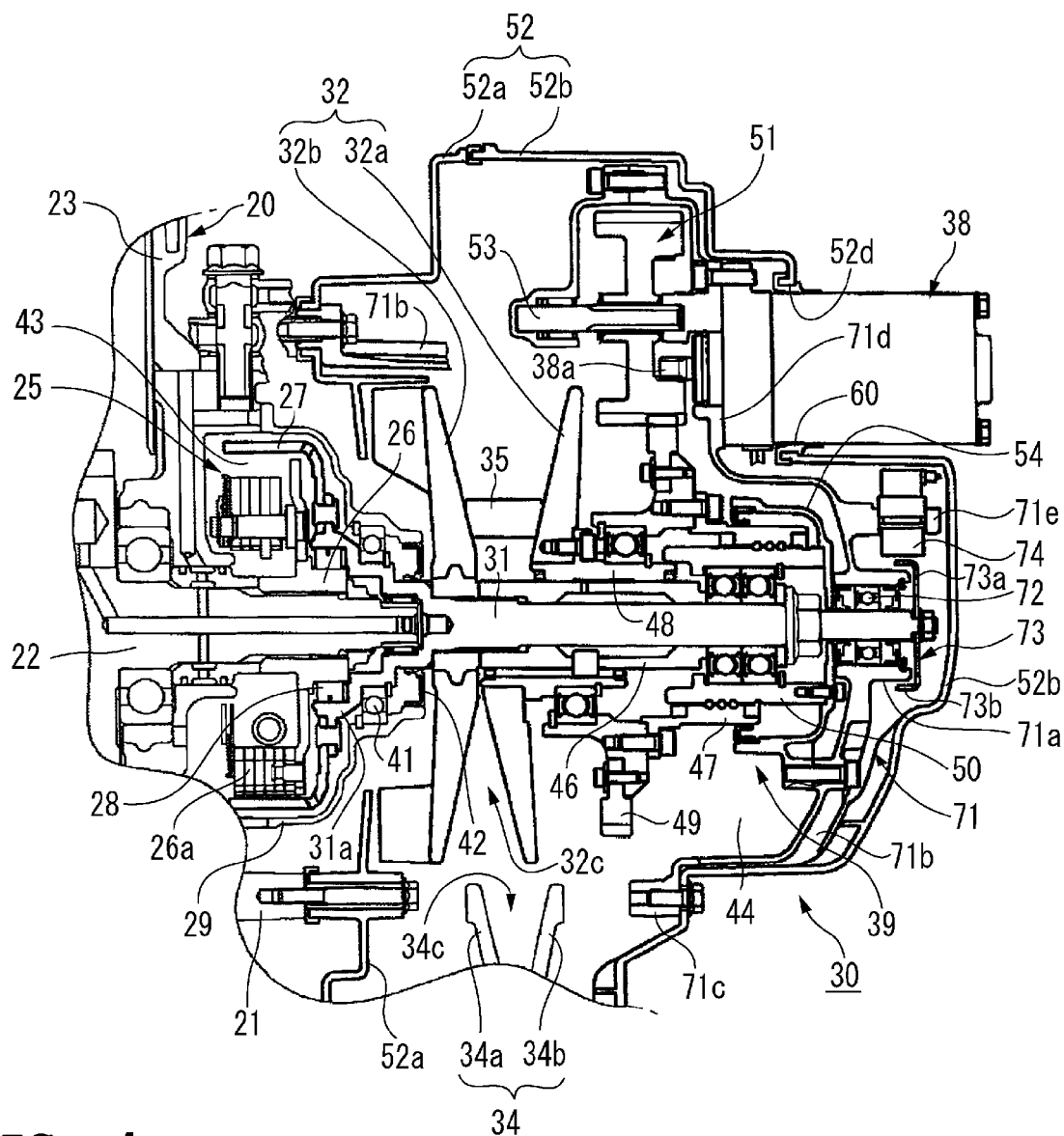
FIG. 4 is a sectional view taken along the line A-A of FIG. 3.
Figure 5:
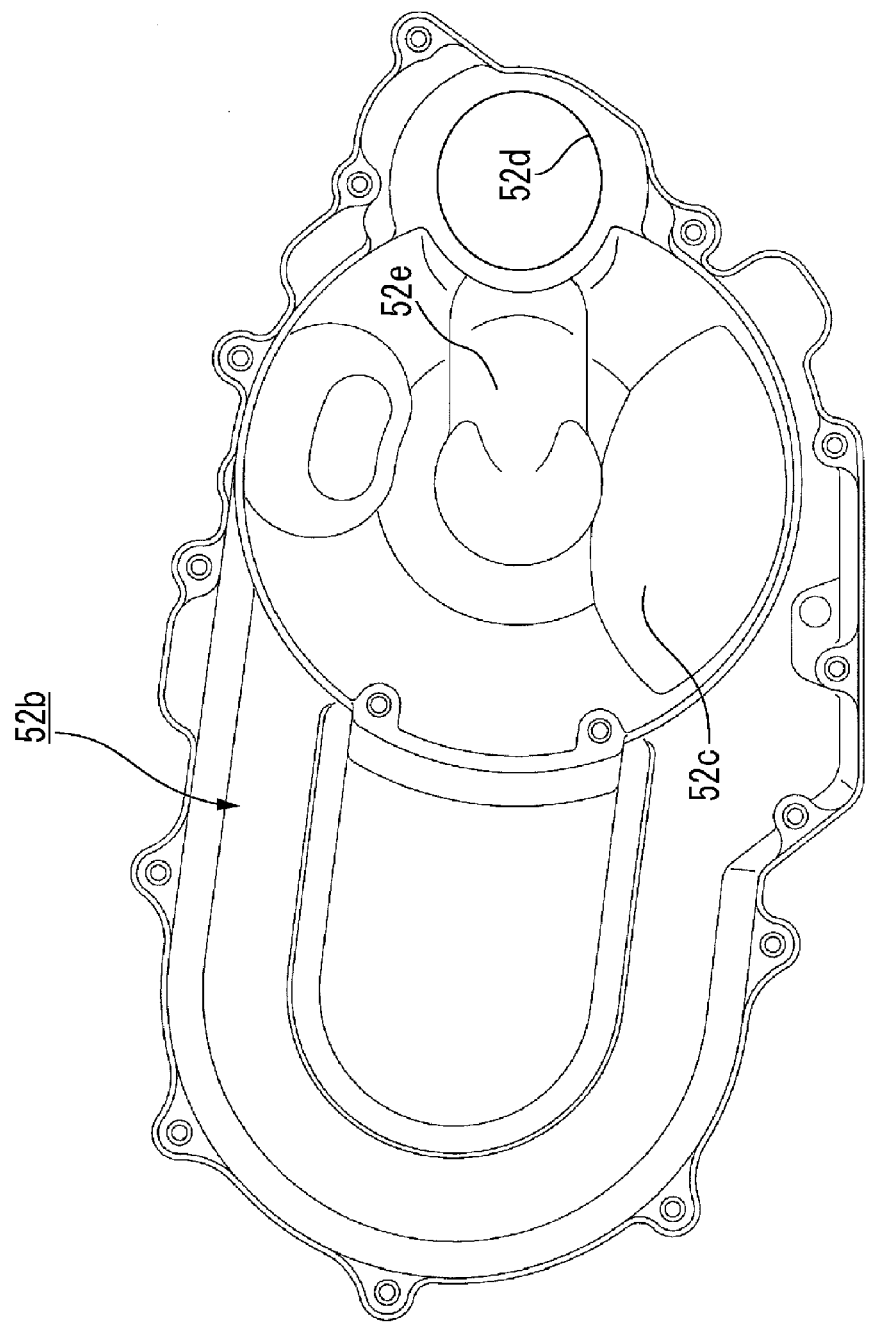
FIG. 5 is a right side view of the cover of the V-belt CVT shown in FIG. 1.

FIGS. 1 through 5 illustrate a straddle-type vehicle incorporating a V-belt CVT according to a first preferred embodiment of the present invention. FIG. 1 is a right side view of the straddle-type vehicle incorporating a power unit in which the V-belt CVT according to the first preferred embodiment of the present invention is assembled to an engine. FIG. 2 is a plan view of the straddle-type vehicle shown in FIG. 1. FIG. 3 is a right side view of the power unit mounted in the straddle-type vehicle shown in FIG. 1 with a cover of the V-belt CVT removed. FIG. 4 is a sectional view taken along the line A-A of FIG. 3. FIG. 5 is a right side view of the cover of the V-belt CVT shown in FIG. 1. In this specification, "left" and "right" refer to the left and right from the rider's point of view.

An ATV (All-Terrain Vehicle) 1 shown in FIGS. 1 and 2 is a straddle-type vehicle having a seat 3, on which the operator (rider) straddles, located generally in the center of the upper portion of a body frame 2, and a power unit 4 located below the seat 3. The power unit 4 is an integral unit defined by an engine 20 and a V-belt CVT 30 for transmitting a driving force of the engine 20 to the driving wheels, the power unit being attached to a side of a crankcase 21 of the engine 20 (see FIGS. 3 and 4).

The structure of the ATV 1, and the structures of the engine 20 and the V-belt CVT 30 defining the power unit 4 will be described sequentially below.

In the ATV 1, the upper portion of the body frame 2 in front of the seat 3 is provided with a fuel tank 6 and steering handlebars 5, arranged sequentially forward from the seat 3.

Left and right front wheels 8, 8, each preferably having a wide and low-pressure balloon tire 8a, are disposed in the front portion of the body frame 2 via a front wheel suspension device 7, and left and right rear wheels 10, 10, each having a wide and low-pressure balloon tire 10a, are disposed in the rear portion of the frame 2 via a rear wheel suspension device (not shown).

The body frame 2 is also provided with left and right front fenders 11 for covering the upper side of the respective front wheels 8, left and right rear fenders 12 for covering the upper side of the respective rear wheels 10, and carriers 13, 14 provided on the upper side of the fenders 11, 12 to connect the left and right fenders. The body frame 2 is provided with a footboard 15 as a footrest for supporting the feet of the rider on the lower left and right sides of the seat 3. A bumper 16 is provided at the front end of the frame 2.

As shown in FIGS. 1 and 3, the body frame 2 is preferably a double-cradle type in which a pair of left and right side frames 17, 17, preferably made of steel tubing and arranged generally in a substantially rectangular having a longer dimension sideways, are joined by a number of cross pipes 18 extending in the vehicle width direction.

As shown in FIGS. 3 and 4, the power unit 4 preferably includes a water-cooled 4-cycle single-cylinder engine 20, and a V-belt CVT 30 bolted to the right side of the engine 20, with respect to the crankshaft direction.

As shown in FIG. 3, the engine 20 is mounted on the body frame 2 with an axis of its cylinder inclined upward and forward and a crankshaft 22 (see FIG. 4) oriented horizontally in the vehicle width direction. The upper mating surface of a cylinder block 23 is connected to a cylinder head 24, and the lower mating surface of the cylinder block 23 is connected to a crankcase 21 accommodating the crankshaft 22.

A generator (not shown) is mounted on the left end of the crankshaft 22, and a centrifugal clutch mechanism 25 is mounted on the right end thereof, as shown in FIG. 4.

The centrifugal clutch mechanism 25 includes an inner drum 26 spline-coupled with the crankshaft 22 to rotate together therewith, an outer drum 27 arranged to surround an outer periphery of the inner drum 26, and a one-way clutch 28 interposed between bosses of the pair of drums 26, 27.

As the rotational speed of the crankshaft 22 increases, a weight 26a of the inner drum 26 is pressed against the outer drum 27 by centrifugal force so that the outer drum 27 rotates.

The one-way clutch 28 functions to transmit power from the rear wheels to the crankshaft 22 in reverse in order to provide engine braking.

As shown in FIG. 4, the V-belt CVT 30 includes a primary sheave 32 disposed on a primary sheave shaft 31, to a first end of which the driving force of the engine 20 is input from the crankshaft 22 via the centrifugal clutch mechanism 25, and having a movable sheave half 32a and a fixed sheave half 32b to form a V-groove 32c for receiving a belt; a secondary sheave 34 disposed on a secondary sheave shaft 33 (see FIG. 2), from one end of which the driving force for the driving wheels is output, and having a movable sheave half 34a and a fixed sheave half 34b to form a V-groove 34c for receiving a belt; a V-belt 35 received in the respective V-grooves 32c, 34c of the primary sheave 32 and the secondary sheave 34 to transmit a rotational driving force between both the sheaves; an electric motor 38; a control device (not shown) for controlling the electric motor 38 according to the vehicle running condition (operating condition); a sheave drive mechanism 39 for transmitting the driving force of the electric motor 38 to the movable sheave half 32a of the primary sheave 32 via a speed reduction mechanism 51 to control the respective groove widths of the primary sheave 32 and the secondary sheave 34; and a rotational speed sensor 74 for detecting rotation of the primary sheave shaft 31 to inform the control device of the detected rotation.

The primary sheave shaft 31 is coaxial with the crankshaft 22, and rotatably supported by the centrifugal clutch mechanism 25 and a support member 71 such that a first end of the primary sheave shaft 31 is on the right end of the crankshaft 22. The first end (left end) of the primary sheave shaft 31 facing the crankshaft 22 is integral with a skirt 31a passing through an opening in the center of an end of a clutch cover 29 and surrounding the right end of the crankshaft 22. The skirt 31a is riveted or otherwise secured to the outer drum 27 of the centrifugal clutch mechanism 25.

The second end (right end) of the primary sheave shaft 31 is rotatably supported, via a roller bearing 72, on the center of the support member 71 secured to the crankcase 21.

As shown in FIG. 3, the die-cast aluminum support member 71 includes a bearing holding part 71a for supporting the right end of the primary sheave shaft 31 via the roller bearing 72, four legs 71b extending in four directions from the bearing holding part 71a, an annular coupling part 71c for coupling the legs 71b with a specific radius, a motor attachment part 71d provided on the annular coupling part 71c, and a sensor attachment part 71e. Ends of the legs 71b are bolted to the crankcase 21.

The primary sheave shaft 31, supported as described above, is connected through the centrifugal clutch mechanism 25 to the crankshaft 22 in order to rotate together therewith when the rotational speed of the crankshaft 22 reaches a specific speed or higher.

The base end of the clutch cover 29 is secured to the crankcase 21. A portion of the clutch cover 29, around a center opening at its end, is provided with a bearing 41 for rotatably supporting the primary sheave shaft 31, and a seal member 42 for sealing between the opening and the outer periphery of the skirt 31a. The clutch cover 29 surrounds a space 43 accommodating the centrifugal clutch mechanism 25 in a liquid-sealed manner to prevent oil used for the centrifugal clutch mechanism 25 from leaking into a belt chamber 44 of the V-belt CVT 30.

In this preferred embodiment, as shown in FIG. 4, the movable sheave half 32a of the primary sheave 32 is located toward the second end of the primary sheave shaft with respect to the fixed sheave half 32b of the primary sheave 32.

Also, as shown in FIG. 4, the outer periphery of the secondary sheave 34 is located adjacent to the outer periphery of the primary sheave 32. This can effectively minimize the size of the V-belt CVT 30 in the longitudinal direction of the vehicle to achieve compactness.

In this preferred embodiment, as shown in FIG. 4, the sheave drive mechanism 39 is located toward the second end of the primary sheave shaft 31 with respect to the movable sheave half 32a of the primary sheave 32.

As shown in FIG. 4, the sheave drive mechanism 39 includes a guide tube 46 spline-fitted or otherwise mounted on the outer periphery of the primary sheave shaft 31 so as not to rotate relative thereto, a slider 48 mounted on the outer periphery of the guide tube 46 so as to be movable only axially and to which the movable sheave half 32a is secured, a rotary slide member 47 rotationally coupled with the outer periphery of the slider 48 via a bearing so as not to move axially relative thereto and to which a reciprocating gear 49 is secured, a feed guide tube 50 having a ball screw screwed on the rotary slide member 47 to move the rotary slide member 47 in the axial direction of the primary sheave shaft 31 according to the rotation direction and amount of the reciprocating gear 49, and a speed reduction mechanism 51 for reducing the rotational speed of the electric motor 38 and inputting the reduced rotation to the reciprocating gear 49. The feed guide part 50 is bolted to an outer member 54 for covering an end of the rotary slide member 47, and the outer member 54 is bolted to the support member 71.

The sheave drive mechanism 39 controls axial movement of the movable sheave half 32a according to the rotation input from the electric motor 38 to the reciprocating gear 49 via the speed reduction mechanism 51.

In the power unit 4 of this preferred embodiment, the electric motor 38 is located closer to the primary sheave shaft 31 than the speed reduction gear mechanism 51 of the sheave drive mechanism 39 is, as viewed in the sheave shaft direction, and secured to the motor attachment part 71d of the support member 71 from the outer side in the vehicle width direction. That is, the driving force of the electric motor 38 can be transmitted to the reciprocating gear 49 via the speed reduction gear mechanism 51 rotatably supported on a support shaft 53, the speed reduction gear mechanism 51 being located farther away from the reciprocating gear 49 than a motor shaft 38a of the electric motor 38 is.

In this way, the power transmission path from the electric motor 38 to the reciprocating gear 49 via the support shaft 53 of the speed reduction gear mechanism 51 can be inverted to the primary sheave shaft 31 side, thereby placing the electric motor 38 closer to the primary sheave shaft 31.

Thus, an imbalanced weight of the power unit 4 due to the heavy electric motor 38 can be improved.

The movable sheave half 34a of the secondary sheave 34 is normally urged by a spring member in the direction of reducing the groove width, so that the groove width is controlled based on the balance between the urging force and the tension of the wrapped V-belt 35.

Thus, when the groove width of the primary sheave 32 is controlled by operation of the sheave drive mechanism 39 and hence the wrapping diameter of the V-belt 35 around the primary sheave 32 is changed, the tension of the V-belt 35 and hence the groove width of the secondary sheave 34 are changed accordingly for a specific speed change ratio.

As shown in FIGS. 3 and 4, a portion of the primary sheave shaft 31 on the other end with respect to the primary sheave 32 is provided with a measurement plate 73 as a part to be detected by the rotational speed sensor 74 in order to detect the rotational speed of the primary sheave shaft 31.

As shown in FIG. 3, the measurement plate 73 includes a disk 73a and projections for measurement 73b provided on the outer periphery of the disk 73a at regular intervals, and has a smaller outside diameter than the reciprocating gear 49 of the drive mechanism 39.

In this preferred embodiment, the measurement plate 73 is located toward the second end of the primary sheave shaft 31 with respect to the roller bearing 72 which rotatably supports the second end of the primary sheave shaft 31, that is, located at the axial end of the primary sheave shaft 31. The measurement plate 73 has a larger outside diameter than the roller bearing 72. That is, the measurement plate 73 is larger than the roller bearing 72 and smaller in outside diameter than the reciprocating gear 49.

The measurement plate 73 is concentric with the primary sheave shaft 31 and secured to the axial end of the primary sheave shaft 31 by a nut or other suitable fixing element.

In this preferred embodiment, the rotational speed sensor 74 for detecting rotation of the primary sheave shaft 31 based on rotation of the measurement plate 73 is located toward the second end of the primary sheave shaft 31 with respect to the sheave drive mechanism 39 and around the outer periphery of the measurement plate 73.

The rotational speed sensor 74 is attached to the support member 71 via the attachment part 71e located a suitable distance away from the measurement plate 73 in a radially outward direction, and measures rotation of the primary sheave shaft 31 based on the passing of the projections 73b to inform the control device of the measured rotational speed for controlling the operation of the electric motor 38.

As shown in FIG. 3, the rotational speed sensor 74 is attached to the support member 71 above a horizontal plane including the primary sheave shaft 31.

Out of the constituent parts of the V-belt CVT 30, those other than the electric motor 38 are accommodated in a transmission case 52 connected to a side of the crankcase 21. The plastic or resin transmission case 52 includes a lower case 52a connected to a mating surface of the crankcase 21 on the right side in the crankshaft direction, and an upper case 52b removably attached to the lower case 52a, and defines the belt chamber 44 beside the crankcase 21.

As shown in FIG. 5, the upper case 52b as a cover of the V-belt CVT 30 is provided with a recess 52c for ensuring a space for the foot of the rider so that the projecting upper case 52b will not interfere with the rider placing his/her foot on the footboard 15 as a footrest. In addition, the upper case 52b is provided with a motor attachment hole 52d for allowing a housing of the electric motor 38 to pass therethrough and is sealed by a seal member 60 (see FIG. 4). Further, the upper case 52b is provided with a projecting portion 52e, in accordance with the above-described position of the rotational speed sensor 74, for covering the outside of the rotational speed sensor 74.

The footboard 15 is located on the outer side of the V-belt CVT 30 in the vehicle width direction, as shown in FIG. 2, and below the primary sheave shaft 31 and the secondary sheave shaft 33.

In the ATV 1 of this preferred embodiment, as shown in FIG. 2, the output of the secondary sheave shaft 33 of the power unit 4 is transmitted to an intermediate shaft 76 and an output shaft 77 via a suitable gear train, and then from the output shaft 77 to a power transmission shaft 79 disposed in the longitudinal direction of the vehicle via a bevel gear mechanism 78.

The power is then transmitted from the power transmission shaft 79 via a front/rear universal joint 62 to a front wheel drive shaft 63 and a rear wheel drive shaft 64 which are connected to the left and right front wheels 8 and the left and right rear wheels 10, respectively.

In this preferred embodiment, as shown in FIG. 1, an exhaust pipe 80 of the engine 20 is disposed above the V-belt CVT 30, and the electric motor 38 is disposed in front of the V-belt CVT 30.

This arrangement prevents the electric motor 38 from interfering with the foot of the rider and the exhaust pipe 80.

As described above, in the V-belt CVT 30 of the ATV 1, the electric motor 38 for controlling the respective groove widths of the primary sheave 32 and the secondary sheave 34 is located above the vicinity of the front end of the footrest 15, providing a gap through which the foot of the rider can get in and out easily between the footrest and the electric motor 38.

Thus, the electric motor 38 does not prevent the rider from putting his/her foot in place. In addition, the electric motor 38 is located spaced away from the cylinder block 23 of the engine 20 which produces substantial heat and on the outer side of the vehicle body where the influence of heat from the engine 20 is less likely, and thus does not deteriorate because of heat from the engine 20.

In the V-belt CVT 30 of the above-described preferred embodiment, the measurement plate 73, as a part to be detected for detecting a rotational speed necessary to electrically control the respective groove widths of the primary sheave 32 and the secondary sheave 34, is located on an opposite end of the primary sheave shaft 31 with respect to the primary sheave 32. In addition, the rotational speed sensor 74 for detecting rotation of the primary sheave shaft 31 based on rotation of the measurement plate 73 is located around the outer periphery of the measurement plate 73.

In this way, the rotational speed sensor 74 can be located spaced away from the cylinder block 23 of the engine 20 which can be hot. Also, it is not necessary to ensure an installation space for the rotational speed sensor 74 around the outer periphery of the primary sheave 32.

Thus, it is possible to obtain a compact, yet durable V-belt CVT 30 achieving a speed change operation highly responsive to the vehicle running condition (engine operating condition).

In the ATV 1 disclosed in the above-described preferred embodiment, the compact V-belt CVT 30 is located below the seat 3 and the rotational speed sensor 74 is located above a horizontal plane including the primary sheave shaft 31. In this way, a projection toward a lateral side of the vehicle body due to the installation of the rotational speed sensor 74 is arranged above where the foot is placed on the footboard 15 and thus does not prevent the rider from putting his/her foot in place.

Thus, it is possible to provide a rotational speed sensor 74, which is necessary to electrically control the respective groove widths of the sheaves 32, 34 in the V-belt CVT 30, without sacrificing the possibility of a compact V-belt CVT 30 located below the seat 3 and hindering the rider from putting his/her feet in place on both sides of the vehicle body, thereby achieving an ATV 1 with speed a change operation highly responsive to the vehicle running condition.

In the V-belt CVT 30 of the above-described preferred embodiment, the sheave drive mechanism 39 for controlling the respective groove widths of the primary sheave 32 and the secondary sheave 34 through the electric motor 38 is located on on the primary sheave shaft 31 on the other side of the movable sheave half 32a of the primary sheave 32 with respect to the fixed sheave half 32b of the primary sheave 32, and the rotational speed sensor 74 is located toward the second end of the primary sheave shaft 31 with respect to the sheave drive mechanism 39.

In this way, installing the rotational speed sensor 74 at the second end of the primary sheave shaft 31, where there are no parts with a large outside diameter, facilitates ensuring an installation space for the rotational speed sensor 74 and prevents increases in the size of the device due to the installation of the rotational speed sensor 74.

In the V-belt CVT 30 of the above-described preferred embodiment, the measurement plate 73 as a part to be detected for the rotational speed sensor 74 is smaller in outside diameter than the reciprocating gear 49 in the sheave drive mechanism 39. In addition, the rotational speed sensor 74 is located around the outer periphery of the measurement plate 73.

With this structure, as shown in FIG. 4, an installation space for the rotational speed sensor 74 can be ensured between the measurement plate 73 at the axial end of the primary sheave shaft 31 and the electric motor 38, thereby achieving a compact V-belt CVT 30.

In the V-belt CVT 30 of the above-described preferred embodiment, the measurement plate 73 is located closer to the second end of the primary sheave shaft 31 than the roller bearing 72 for supporting the end of the primary sheave shaft 31 is, and is larger in outside diameter than the roller bearing 72.

In this way, the measurement plate 73 covers the axial end of the roller bearing 72, and thus can prevent foreign matter from entering the roller bearing 72 to maintain the performance of the roller bearing 72 for an extended period.

In the V-belt CVT 30 of the above-described preferred embodiment, the rotational speed sensor 74 is attached to the sensor attachment part 71e of the support member 71 secured to the crankcase 21. Since the support member 71 has a sturdy construction to support the primary sheave shaft 31, the use of the support member 71 allows secure attachment of the rotational speed sensor 74.

In the V-belt CVT 30 of the above-described preferred embodiment, portions of the sheave drive mechanism 39 and the electric motor 38 are also attached to the support member 71. In this way, the use of the sturdy support member 71 as an attachment bracket can achieve secure attachment of the respective parts without using an additional dedicated attachment bracket.

In the case where the crankshaft 22 and the primary sheave shaft 31 are connected via the clutch mechanism as in the present preferred embodiment, attaching the rotational speed sensor 74 to the second end of the primary sheave shaft 31 allows accurate detection of the rotational speed of the primary sheave shaft 31. Thus, in addition to the above-described effects, the accurate detection of the rotational speed of the primary sheave shaft 31 allows accurate detecting of the actual speed change ratio of the V-belt CVT 30, resulting in an optimum suitable speed change ratio in accordance with the running condition such as the running speed, opening the accelerator, etc.

Figure 6:
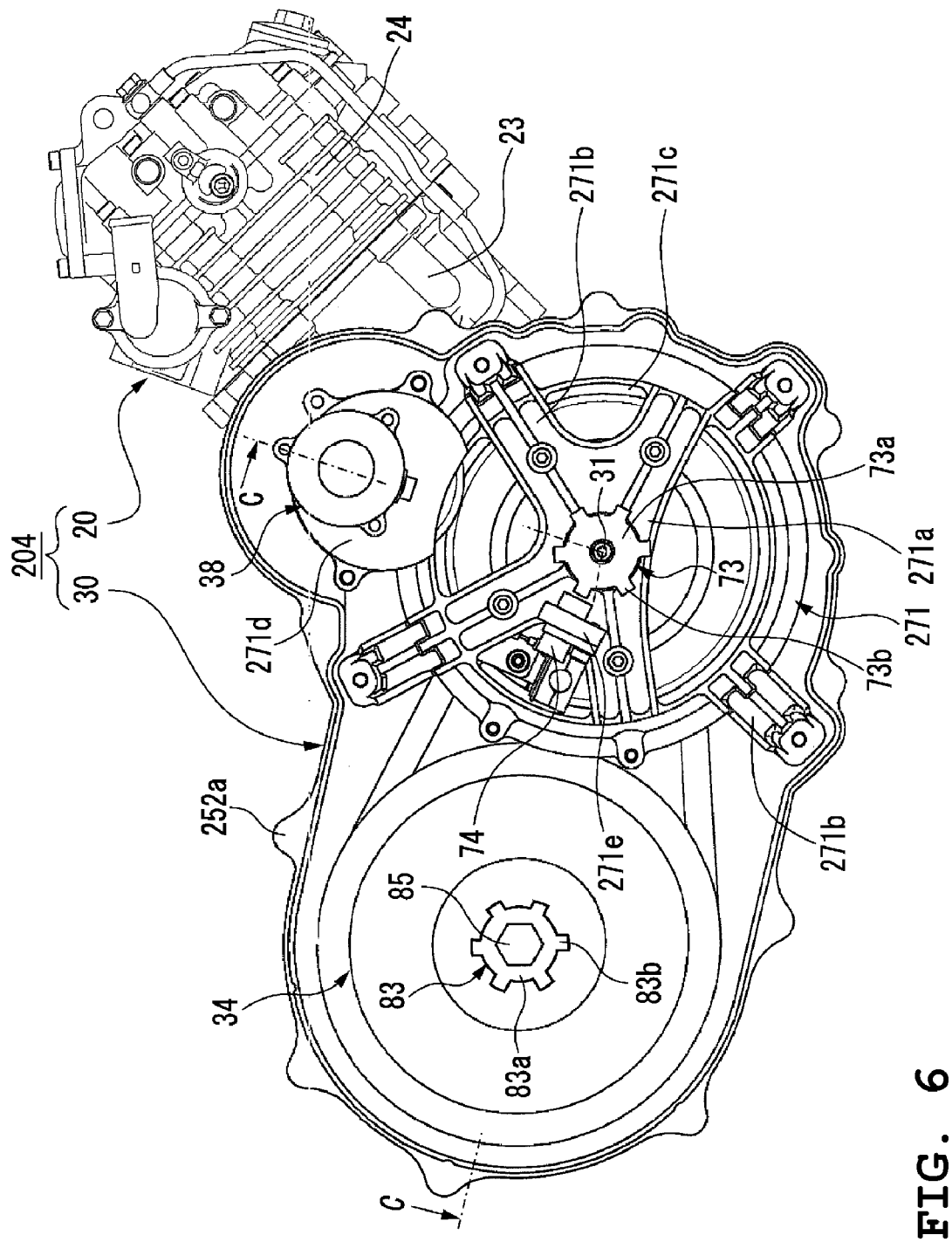
FIG. 6 is a right side view of a power unit incorporating a V-belt CVT according to a second preferred embodiment of the present invention.
Figure 7:
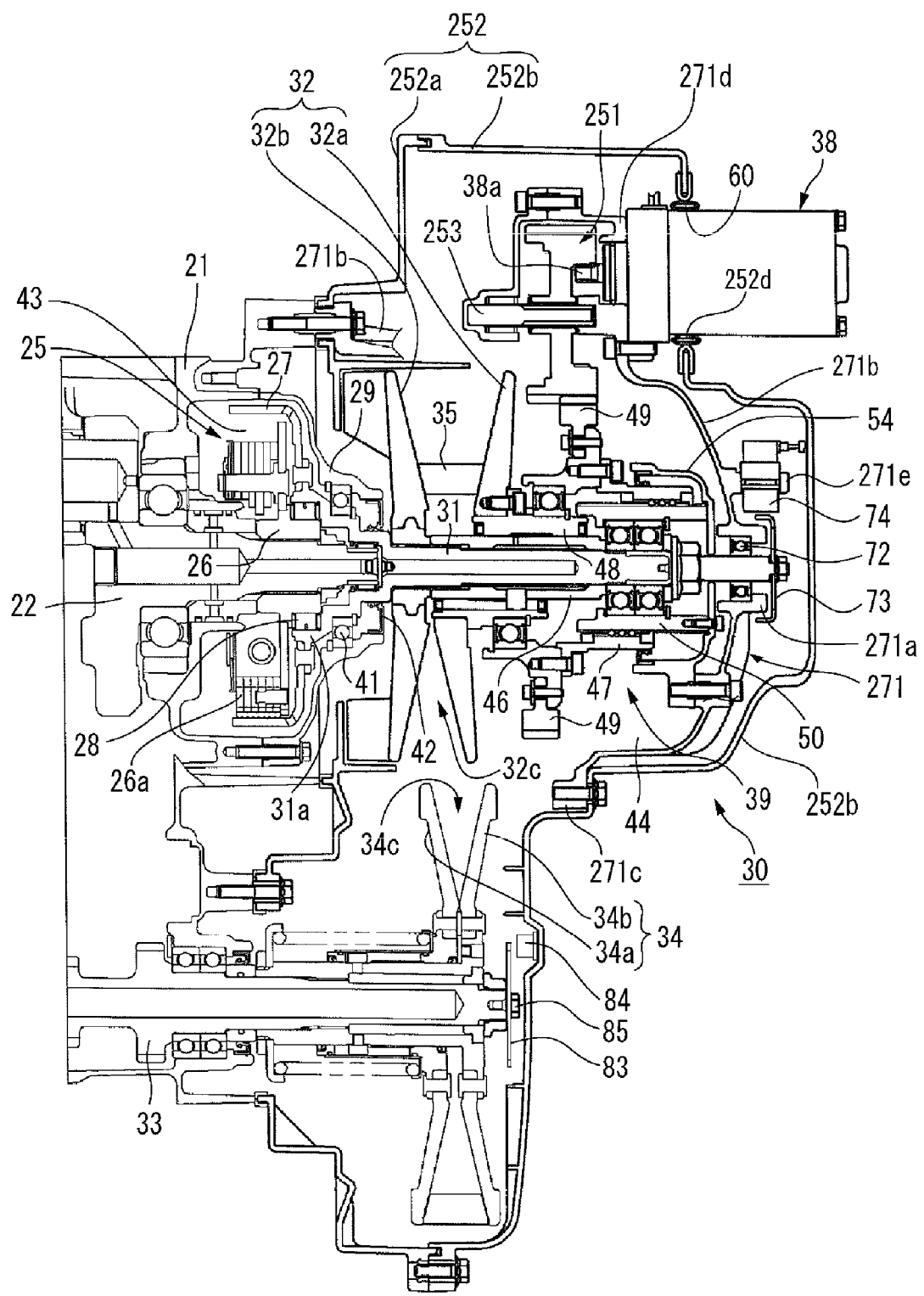
FIG. 7 is a sectional view taken along the line C-C of FIG. 6.
Figure 8:
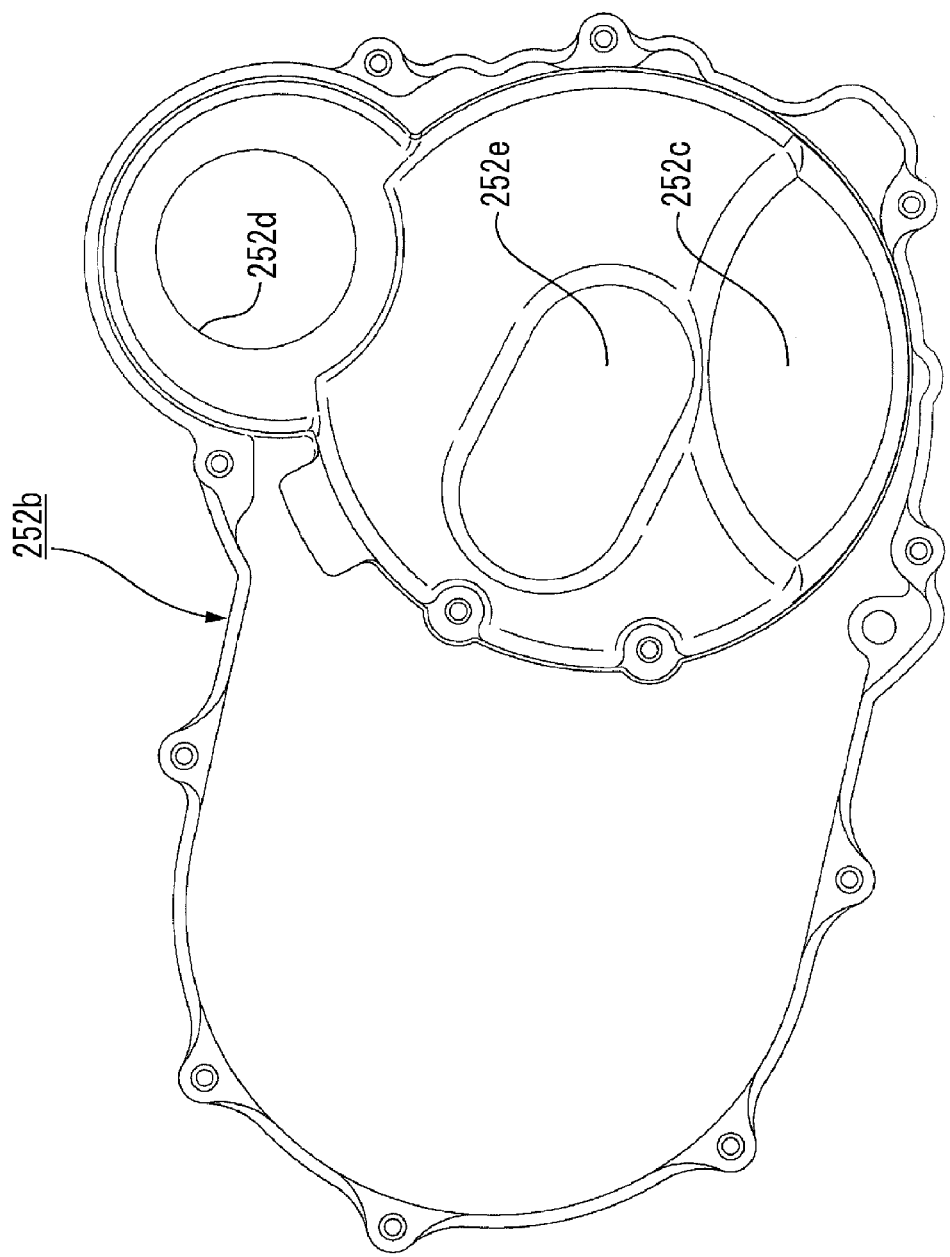
FIG. 8 is a right side view of the V-belt CVT shown in FIG. 6 with its cover attached.

FIGS. 6 through 9 illustrate a power unit in which a V-belt CVT according to a second preferred embodiment of the present invention is assembled to an engine. FIG. 6 is a right side view of the power unit incorporating the V-belt CVT according to the second preferred embodiment of the present invention. FIG. 7 is a sectional view taken along the line C-C of FIG. 6. FIG. 8 is a right side view of the V-belt CVT shown in FIG. 6 with its cover attached. Constituent parts of a power unit 204 according to the second preferred embodiment which are similar or identical to those of the power unit 4 according to the above-described first preferred embodiment are given the same reference numerals and detailed description thereof is omitted.

As shown in FIGS. 6 and 7, the power unit 204 of the second preferred embodiment is an integral unit including an engine 20 and a V-belt CVT 130 for transmitting the driving force of the engine 20 to driving wheels which are connected to a side of a crankcase 21 of the engine 20.

The power unit 204 of the second preferred embodiment is preferably similar to the power unit 4 of the first preferred embodiment in that the sheave drive mechanism 39 is located around the primary sheave shaft 31 and that the electric motor 38 is located on the outer side of the sheave drive mechanism 39, but not in that the electric motor 38 for transmitting the driving force to the sheave drive mechanism 39 is located close to and above the primary sheave shaft 31, as viewed in the sheave shaft direction.

As shown in FIG. 6, a support member 271 in the power unit 204 of the second preferred embodiment includes a bearing holding part 271a for supporting the right end of the primary sheave shaft 31 via a roller bearing 72, four legs 271b extending in four directions from the bearing holding part 271a, an annular coupling part 271c for coupling the legs 271b with a specific radius, a motor attachment part 271d provided on the annular coupling part 271c, and a sensor attachment part 271e.

The electric motor 38 is secured to the motor attachment part 271d, which is provided on the upper side of the support member 271, from the outer side in the vehicle width direction. The constituent parts of the V-belt CVT 130 other than the electric motor 38 are accommodated in a transmission case 252 connected to a side of the crankcase 21. Thus, the driving force of the electric motor 38 can be transmitted to the reciprocating gear 49 via a speed reduction gear mechanism 251 rotatably supported on a support shaft 253.

The rotational speed sensor 74 is secured to the sensor attachment part 271e of the support member 271, which is located toward the secondary sheave 34 side above the horizontal plane including the primary sheave shaft 31.

In addition, as shown in FIG. 7, the power unit 204 of the second preferred embodiment is additionally provided with a rotational speed sensor 84 for detecting the rotational speed of the secondary sheave shaft 33, and a measurement plate 83 as a part to be detected by the rotational speed sensor 84.

The measurement plate 83 is located on a portion of the secondary sheave shaft 33, from a first end of which a driving force for the driving wheels is output, toward a second end of the secondary sheave shaft 33 with respect to the secondary sheave 34.

As shown in FIG. 6, the measurement plate 83 includes a disk 83a and projections for measurement 83b provided on the outer periphery of the disk 83a at regular intervals. The disk 83a is concentric with the secondary sheave shaft 33 and secured toward a second end of the secondary sheave shaft 33 with respect to the secondary sheave 34 (that is, the right end) by a bolt 85.

The rotational speed sensor 84 is secured to an upper case 252b of the transmission case 252 so as to be located around the outer periphery of the measurement plate 83 and above a horizontal surface including the secondary sheave shaft 33. The rotational speed sensor 84 measures rotation of the secondary sheave shaft 33 based on the passing of the projections for measurement 83b of the measurement plate 83 to inform the control device of the measured rotational speed for controlling the operation of the electric motor 38.

The plastic or resin transmission case 252 is defined by a lower case 252a connected to a mating surface of the crankcase 21 on the right side in the crankshaft direction, and an upper case 252b removably attached to the lower case 252a.

As shown in FIG. 8, the upper case 252b as a cover of the V-belt CVT 130 is provided with a recess 252c for ensuring a space for the foot of the rider so that the projecting upper case 252b will not interfere with the rider's foot. In addition, the upper case 252b is provided with a motor attachment hole 252d for allowing a housing of the electric motor 38 to pass therethrough and is sealed by a seal member 60 (see FIG. 7). Further, the upper case 252b is provided with a projecting portion 252e, in accordance with the above-described position of the rotational speed sensor 84, for covering the outside of the rotational speed sensor 84.

Since the V-belt CVT 130 of the second preferred embodiment is additionally provided with a rotational speed sensor 84 for detecting rotation of the secondary sheave shaft 33, it is possible to accurately detect the actual speed change ratio of the V-belt CVT 130 based on information from the rotational speed sensor 84 and information from the rotational speed sensor 74 for detecting rotation of the primary sheave shaft 31, resulting in an optimum speed change ratio in accordance with the running condition such as the running speed, opening the accelerator, etc.

Various preferred embodiments of the present invention can be applied to straddle-type vehicles other than ATVs (All-Terrain Vehicles) such as those disclosed in the above preferred embodiments. For example, the straddle-type vehicles according to the present invention include motorcycles, motorbikes, scooters, buggies, golf carts, and other various vehicles having a seat where the rider straddles.

The structures of the rotational speed sensor and the part to be detected by the rotational speed sensor according to the present invention are not limited to those disclosed in the above preferred embodiments, but various modifications may be made thereto without departing from the sprit and scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A V-belt continuously variable transmission comprising:
a primary sheave disposed on a primary sheave shaft, to one side of which a driving force of an engine is input, and having a movable sheave half and a fixed sheave half arranged to define a V-groove for receiving a belt;
a secondary sheave disposed on a secondary sheave shaft, from which a driving force for a driving wheel is output, and having a movable sheave half and a fixed sheave half arranged to define a V-groove for receiving a belt;
a V-belt received in the respective V-grooves of the primary sheave and the secondary sheave to transmit a rotational driving force between the primary and secondary sheaves;
an electric motor;
a control device arranged to control the electric motor; and
a sheave drive mechanism arranged to transmit a driving force of the electric motor to the movable sheave half of the primary sheave to control respective groove widths of the primary sheave and the secondary sheave; and
a detection part arranged on the other side of the primary sheave shaft with respect to the primary sheave such that the primary sheave is arranged between the one side of the primary sheave shaft which receives the driving force of the engine and the other side of primary sheave shaft which includes the detection part, the detection part arranged to be detected by a rotational speed sensor so as to detect a rotational speed of the primary sheave shaft.

2. The V-belt continuously variable transmission according to claim 1, wherein the sheave drive mechanism is arranged on the primary sheave shaft on the other side of the movable sheave half of the primary sheave with respect to the fixed sheave half of the primary sheave, and the rotational speed sensor is arranged toward the other side of the primary sheave shaft with respect to the sheave drive mechanism.

3. The V-belt continuously variable transmission according to claim 2, wherein the sheave drive mechanism includes a reciprocating gear, and the detection part has an outside diameter smaller than an outside diameter of the reciprocating gear.

4. The V-belt continuously variable transmission according to claim 3, wherein the rotational speed sensor is located adjacent an outer periphery of the detection part.

5. The V-belt continuously variable transmission according to claim 4, wherein the detection part is located closer to the other side of the primary sheave shaft with respect to a roller bearing arranged to support the other side of the primary sheave shaft, and has an outside diameter larger than an outside diameter of the roller bearing.

6. The V-belt continuously variable transmission according to claim 1, further comprising a transmission case including a support member arranged to support the other side of the primary sheave shaft, wherein the rotational speed sensor is attached to the support member secured to the transmission case.

7. The V-belt continuously variable transmission according to claim 6, wherein at least one of a portion of the sheave drive mechanism and the electric motor is attached to the support member.

8. The V-belt continuously variable transmission according to claim 1, further comprising:
   a detection part arranged on the other side of the secondary sheave shaft with respect to the secondary sheave such that the secondary sheave is arranged between the one side of the secondary sheave shaft which outputs the driving force to the driving wheel and the other side of the secondary sheave shaft which includes the detection part, the detection part arranged to be detected by a rotational speed sensor so as to detect a rotational speed of the secondary sheave shaft.

9. A straddle-type vehicle including the V-belt continuously variable transmission according to claim 1, wherein the continuously variable transmission is disposed below a seat of the vehicle, a footrest of the vehicle is disposed outside of the other side of the primary sheave shaft of the V-belt continuously variable transmission in a vehicle width direction, and the rotational speed sensor is located above a horizontal plane including the primary sheave shaft.

10. A straddle-type vehicle including the V-belt continuously variable transmission according to claim 8, wherein the continuously variable transmission is disposed below a seat of the vehicle, and a footrest of the vehicle is disposed outside of the other side of the primary sheave shaft of the V-belt continuously variable transmission in a vehicle width direction.

11. The V-belt continuously variable transmission according to claim 1, wherein the sheave drive mechanism includes a speed reduction gear mechanism, and the electric motor is located closer to the primary sheave shaft than the speed reduction gear mechanism, as viewed in the primary sheave shaft direction.

* * * * *